United States Patent
Slettemeas

(10) Patent No.: US 12,247,484 B2
(45) Date of Patent: Mar. 11, 2025

(54) FIELD DATA ACQUISITION AND VIRTUAL TRAINING SYSTEM

(71) Applicant: Schlumberger Technology Corporation, Sugar Land, TX (US)

(72) Inventor: Tormod Slettemeas, Lysaker (NO)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 651 days.

(21) Appl. No.: 17/596,492

(22) PCT Filed: Jun. 29, 2020

(86) PCT No.: PCT/US2020/040072
§ 371 (c)(1),
(2) Date: Dec. 10, 2021

(87) PCT Pub. No.: WO2020/264479
PCT Pub. Date: Dec. 30, 2020

(65) Prior Publication Data
US 2022/0275723 A1    Sep. 1, 2022

Related U.S. Application Data

(60) Provisional application No. 62/868,103, filed on Jun. 28, 2019.

(51) Int. Cl.
*E21B 49/00* (2006.01)
*G06Q 50/02* (2012.01)

(52) U.S. Cl.
CPC ........... *E21B 49/005* (2013.01); *G06Q 50/02* (2013.01); *E21B 2200/20* (2020.05)

(58) Field of Classification Search
CPC .... G06Q 50/02; E21B 49/005; E21B 2200/20
See application file for complete search history.

(56) References Cited

U.S. PATENT DOCUMENTS

| | | | |
|---|---|---|---|
| 6,549,854 B1 | 4/2003 | Malinverno et al. | |
| 6,829,570 B1* | 12/2004 | Thambynayagam | G01V 11/00 702/14 |

(Continued)

FOREIGN PATENT DOCUMENTS

| | | |
|---|---|---|
| WO | 2010090825 A2 | 8/2010 |
| WO | 2016154404 A1 | 9/2016 |

(Continued)

OTHER PUBLICATIONS

Extended Search Report issued in European Patent Application No. 20832529.0 dated Jun. 22, 2023, 6 pages.

(Continued)

*Primary Examiner* — Elias Desta
(74) *Attorney, Agent, or Firm* — Jeffrey D. Frantz

(57) ABSTRACT

A method includes obtaining data representing a subterranean volume, the data having been collected by a user in a field, generating a digital model representing at least the subterranean volume based in part on the data, searching the digital model based in part on one or more metadata parameters, identifying one or more gaps in the model, and determining a data acquisition activity based on the one or more gaps that were identified in the model.

17 Claims, 12 Drawing Sheets

(56) References Cited

U.S. PATENT DOCUMENTS

| | | |
|---|---|---|
| 10,436,927 B2 | 10/2019 | Sun et al. |
| 2007/0203673 A1 | 8/2007 | Sherrill et al. |
| 2008/0068928 A1* | 3/2008 | Duncan ............... G01V 1/288 367/73 |
| 2009/0119076 A1* | 5/2009 | Madatov ............... G01V 1/282 703/2 |
| 2009/0319243 A1 | 12/2009 | Suarez-Rivera et al. |
| 2010/0177595 A1 | 7/2010 | Khare |
| 2010/0257004 A1 | 10/2010 | Perlmutter |
| 2011/0090760 A1 | 4/2011 | Rickett et al. |
| 2013/0179080 A1 | 7/2013 | Skalinski et al. |
| 2013/0282349 A1 | 10/2013 | Gorell |
| 2014/0222403 A1 | 8/2014 | Lepage et al. |
| 2014/0379317 A1 | 12/2014 | Sanden et al. |
| 2015/0253443 A1 | 9/2015 | Hornbostel et al. |

FOREIGN PATENT DOCUMENTS

| | | |
|---|---|---|
| WO | 2016161295 A1 | 10/2016 |
| WO | 2018217875 A1 | 11/2018 |

OTHER PUBLICATIONS

Casini et al., "Fracture characterization and modeling from virtual outcrops," AAPG Bulletin, Jan. 1, 2016, vol. 100, No. 1, pp. 41-61.

Hopkins, C., "Virtual Reality Geology Field Trips," GEOExPro, Mar. 2019, vol. 16, No. 1, accessed via the Internet on Dec. 5, 2021 https://www.geoexpro.com/articles/2019/virtual-reality-geology-field-trips, 8 pages.

Search Report and Written Opinion of International Patent Application No. PCT/US2018/034109 mailed on Sep. 4, 2018, 10 pages.

International Preliminary Report on Patentability of International Patent Application No. PCT/US2018/034109 mailed on Dec. 5, 2019.

International Search Report and Written Opinion of International Patent Application No. PCT/US2020/040072, mailed Aug. 21, 2020, 10 pages.

Office Action issued in U.S. Appl. No. 16/614,790 dated May 25, 2022, 23 pages.

* cited by examiner

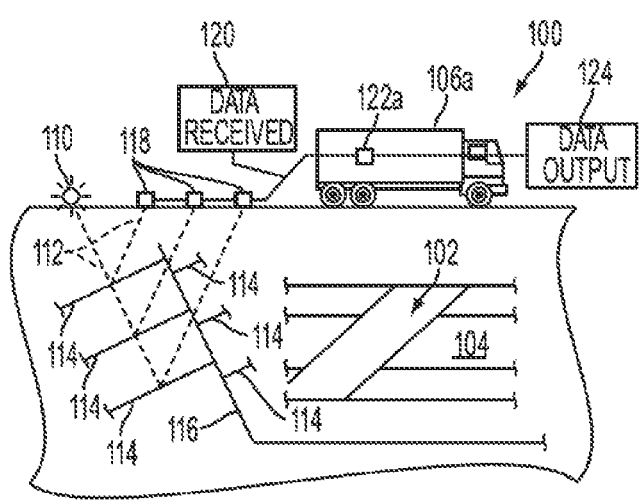
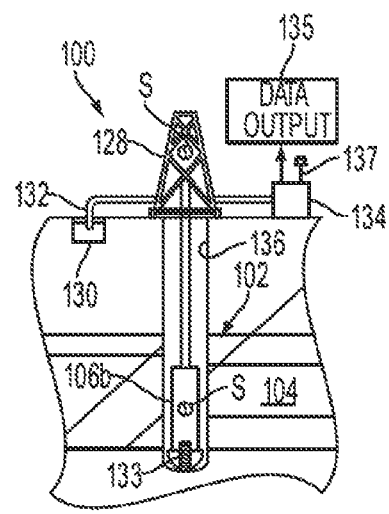
FIG. 1A  FIG. 1B
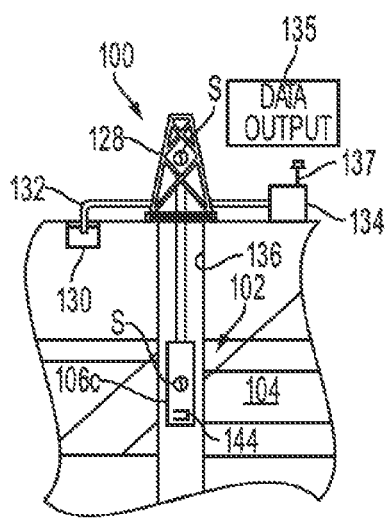
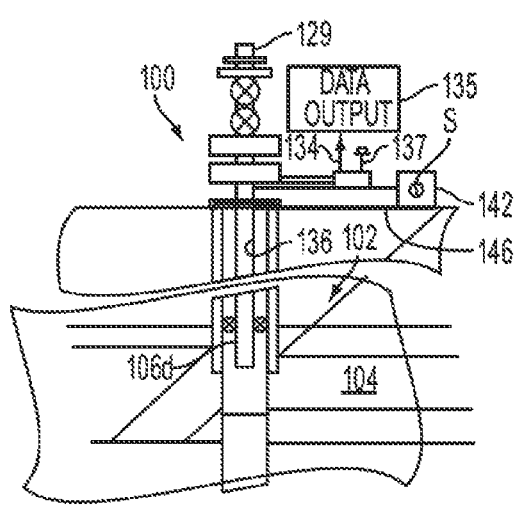
FIG. 1C  FIG. 1D

FIELD DATA ACQUISITION AND VIRTUAL TRAINING SYSTEM

CROSS-REFERENCE TO RELATED APPLICATIONS

This application is a National Stage Entry of International Application No. PCT/US2020/040072, filed on Jun. 29, 2020, which claims priority to U.S. Provisional Patent Application having Ser. No. 62/868,103, which was filed on Jun. 28, 2019, and is incorporated herein by reference in its entirety.

BACKGROUND

In the oil and gas industry, companies involved in exploration, drilling, etc. develop conceptual ideas and models related to the subterranean domain primarily based on well and seismic data. In the exploration phase, data is scarce, and the uncertainty even in the conceptual depositional environment may be high unless supported by data from nearby fields, publications and other unstructured (e.g., text-based) data. Companies therefore may invest in expensive field training or "field trips" for the purpose of understanding geological environments that are similar (analogous) to the reservoir under consideration.

The data collected (photos, manual logs, rocks, notes, and LiDAR/drone images) are gathered, but may not be used in subsequent iterations of field characterization. Further, the data may not generally be used to train the remaining population or other asset teams in the company.

SUMMARY

Embodiments of the disclosure provide a method that includes obtaining data representing a subterranean volume, the data having been collected by a user in a field, generating a digital model representing at least the subterranean volume based in part on the data, searching the digital model based in part on one or more metadata parameters, identifying one or more gaps in the model, and determining a data acquisition activity based on the one or more gaps that were identified in the model.

In an embodiment, the method includes applying metadata to the data in the model. The metadata include text-based information about the data in association with a location in the model. Searching the digital model includes searching the text-based information of the metadata.

In an embodiment, searching includes receiving a search query based on one or more characteristics of a second location, and identifying an analogous location in the model based on the one or more characteristics.

In an embodiment, generating the digital model includes georeferencing the data and incorporating the data into the model based at least in part on the georeferencing. The model includes other data representing the subterranean volume, another subterranean volume, or both.

In an embodiment, generating the digital model includes discretizing the data so as to form a discretized model comprising a plurality of cells.

In an embodiment, the method also includes generating a three-dimensional visualization based at least in part on the model, and generating an immersive training environment using the three-dimensional visualization.

In an embodiment, generating the digital model includes augmenting the data using a well log, and incorporating the well log in the model along a line in the model.

In an embodiment, receiving additional data collected as a result of the data acquisition activity, and updating the model based in part on the additional data collected.

Embodiments also include a non-transitory computer-readable medium storing instructions that, when executed by at least one processor of a computing system, cause the computing system to perform operations. The operations include obtaining data representing a subterranean volume, the data having been collected by a user in a field, generating a digital model representing at least the subterranean volume based in part on the data, searching the digital model based in part on one or more metadata parameters, identifying one or more gaps in the model, and determining a data acquisition activity based on the one or more gaps that were identified in the model.

Embodiments of the disclosure further include a computing system including one or more processors and a memory system including one or more non-transitory computer-readable media storing instructions that, when executed by at least one of the one or more processors, cause the computing system to perform operations. The operations include obtaining data representing a subterranean volume, the data having been collected by a user in a field, generating a digital model representing at least the subterranean volume based in part on the data, searching the digital model based in part on one or more metadata parameters, identifying one or more gaps in the model, and determining a data acquisition activity based on the one or more gaps that were identified in the model.

Embodiments of the disclosure further include a computing system including one or more processors configured to obtain data representing a subterranean volume, the data having been collected by a user in a field, generate a digital model representing at least the subterranean volume based in part on the data, search the digital model based in part on one or more metadata parameters, identifying one or more gaps in the model, and determine a data acquisition activity based on the one or more gaps that were identified in the model.

Embodiments of the disclosure further include a computing system including means for obtaining data representing a subterranean volume, the data having been collected by a user in a field, means for generating a digital model representing at least the subterranean volume based in part on the data, means for searching the digital model based in part on one or more metadata parameters, identifying one or more gaps in the model, and means for determining a data acquisition activity based on the one or more gaps that were identified in the model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
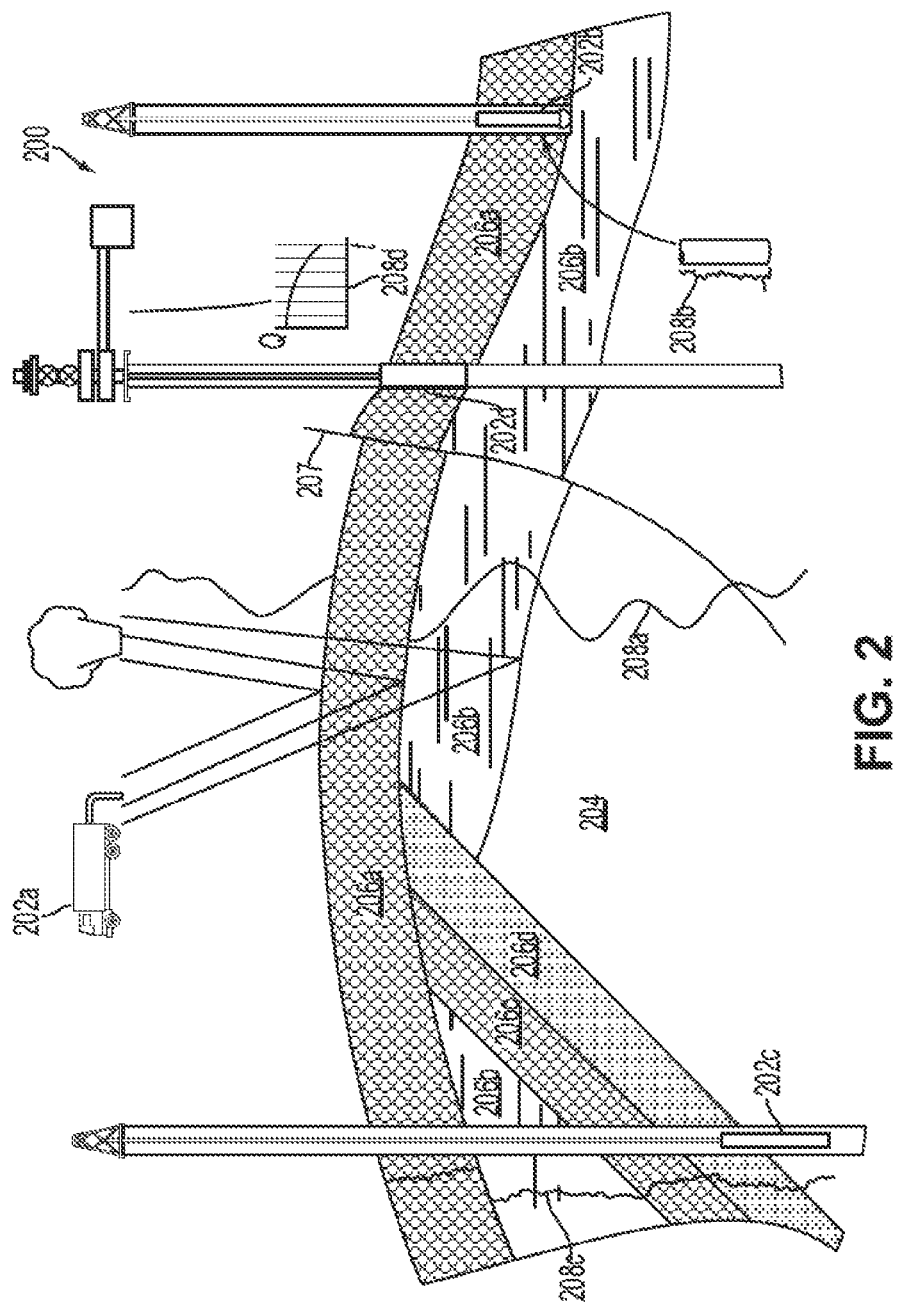

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophone-receivers 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted.

Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean formation 204 has a plurality of geological formations 206a-206d. As shown, this structure has several formations or layers, including a shale layer 206.1, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
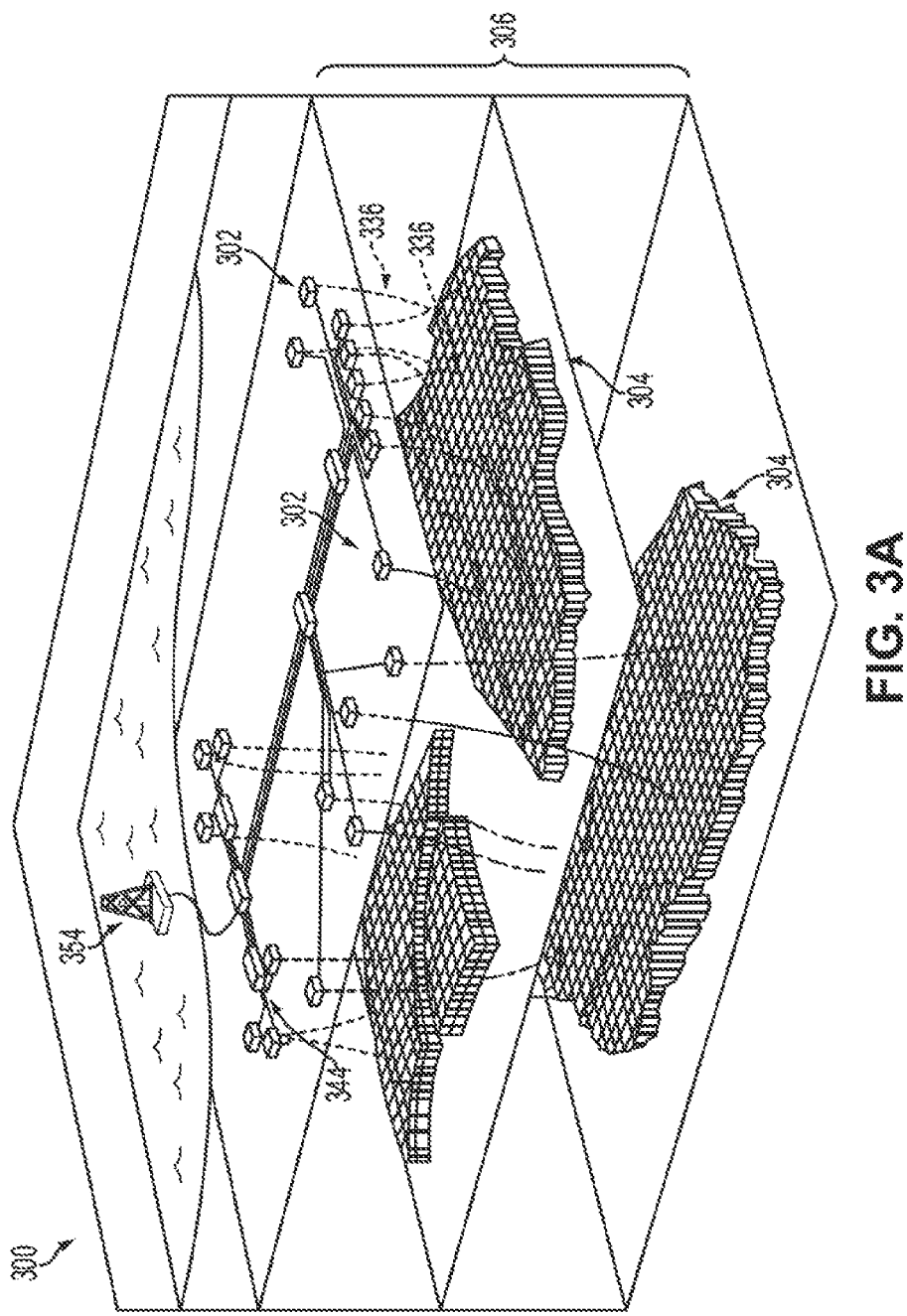

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
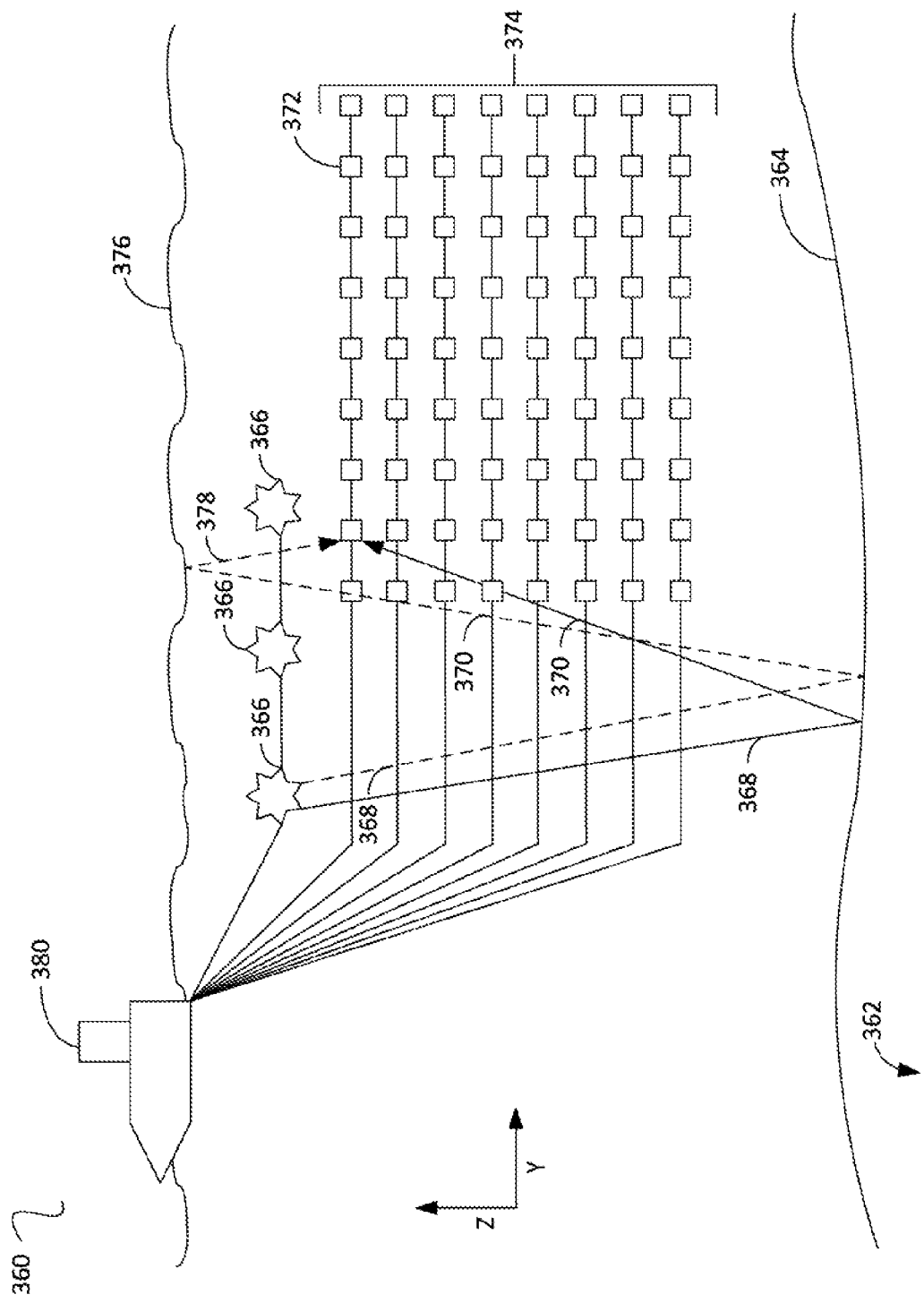

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine-based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In general, at least some embodiments of the disclosure may provide a system and method used for building and continuously feeding an evergreen data repository with analog data. As the term is used herein, "analog" refers to the potential use of the data to inform inferences made about geologically similar or "analogous" areas. In such a repository, data can be managed and fed with new data through various services. The field data (well logs, drone images, etc.) may be georeferenced, interpreted, and incorporated into a model of the domain of interest. Further, the field data may be indexed and referenced within the model, and services can be built or acquired to build analog/image-based models. These image models can be textured and interpreted using (e.g., automated) interpretation tools.

For example, analog data may be stored in a remote server accessible to a user (e.g., "on the cloud"). The user may be an individual or a group of individuals (e.g., a team in an oil and gas company). The data may, for example, be data that is proprietary to an individual company/user. In some embodiments, the data may be supplemented by third-party data, e.g., from external (e.g., subscription) databases.

Such a system may allow a user to explore its analog data in a managed and automated way. Further, the system may allow a user to build and maintain a model based on its analog data of field images, logs etc., or let third parties build and update the analog model as service. The automated texturing and interpretation could be a supplement to enhance the model.

Another aspect to the system is the provision of a virtual training program. The virtual training program may be built on top of a company's field data and may supplement the company's data with other related public/field data as part of the training. Such a program may be implemented using an immersive user environment, e.g., virtual reality, augmented reality, etc.

By using a cloud-based and data-centric solution, analog data can be gathered and added to a data ecosystem in a manner that makes it discoverable. The data can be supplemented by new data from different asset teams in a semi-automated, "evergreen" way, such that it is possible to be continuously updated upon arrival of the new data. Services can be added to reference/index, model, texturize and interpret the analog data. As the data ecosystem is fed, data may be discoverable to facilitate identification of gaps, allowing a user to tailor field trips to fill these gaps in the analog data ecosystem.

Further, as analog data becomes available, services can be built to index and update the analog data used in an exploration plan or knowledge board. Additionally, analog data from an entity be confirmed as stored, indexed, maintained, used, reused, and updated as new data becomes available.

According to some embodiments, entities such as, for example, oil and gas companies, may use the method to feed their own analog data in an ecosystem. Once the data is in the ecosystem, the company can build upon and manage the data, or enable external service providers (e.g., vendors) to provide services to maintain or build new services like managed analog models, training services, etc. that may be live on the data. This may be able to serve a company in an exploration phase and in future also help learn and train a field on analog fields using machine learning and artificial intelligence, which can fill gaps or add to augmented or global data, e.g., through subscription etc.

Figure 4:
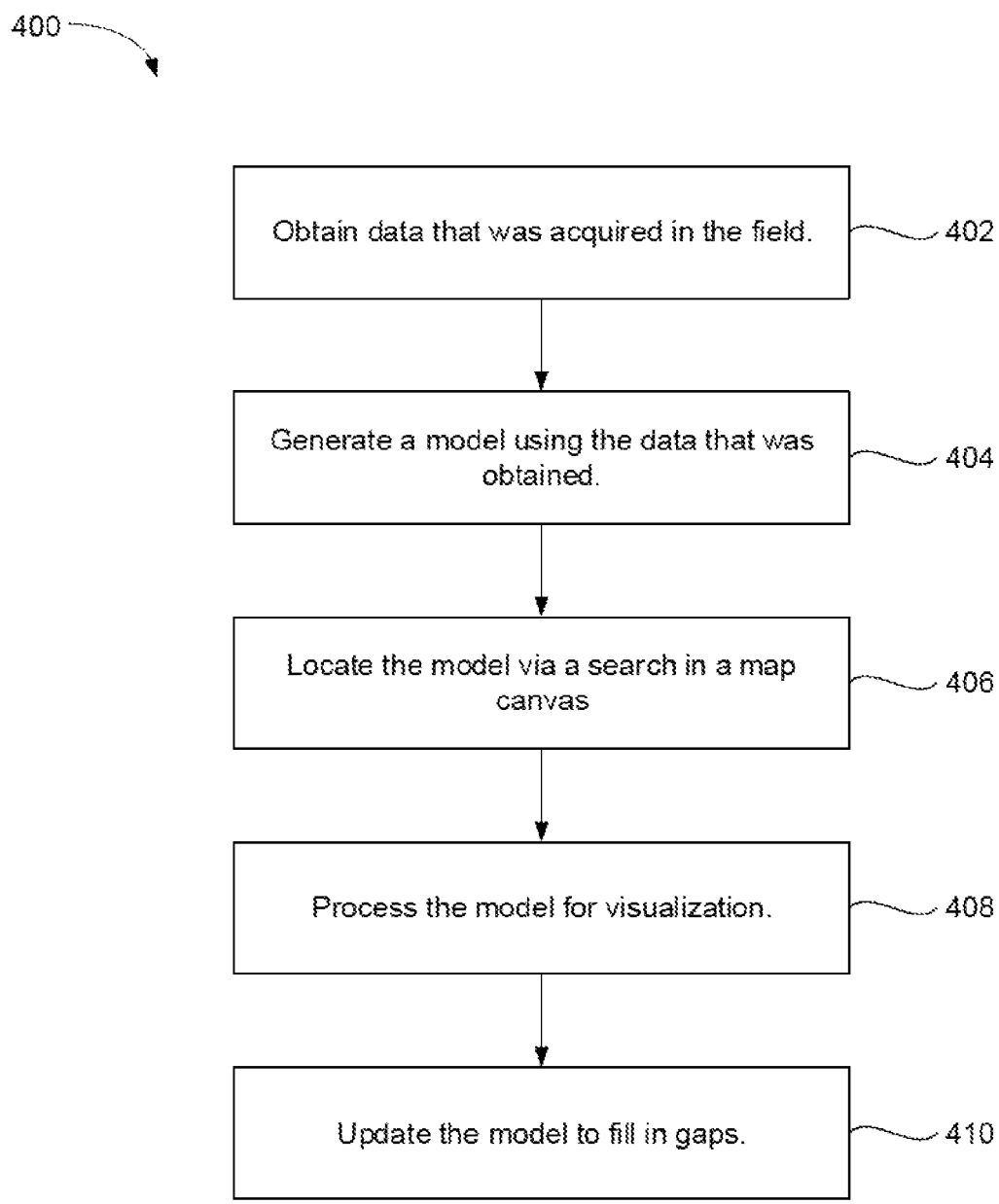
FIG. 4 illustrates a flowchart of a method for receiving, storing, and using data, e.g., to build geologic analog models, according to an embodiment.

FIG. 4 illustrates a flowchart of a method 400 for receiving, storing, and using data, e.g., to build geologic analog models, according to an embodiment. Such models may be searched and used to inform decisions for subsequent exploration activities. The method 400 may include obtaining data that was acquired in a field, as at 402. The data may be acquired at the surface, e.g., pictures, drone images, LiDAR, hyperspectral imagery, satellite imagery, etc. The data may also include data representing the subterranean domain directly, such as seismic data, well logs, core sample data, etc. Further, the data may be received at 402 in a remote computing environment, e.g., on the cloud.

The acquired data may be used to generate a model, as at 404. To generate the model, the data that is collected may be georeferenced, its location is denoted and contextualized within an overall model. The georeferenced data may be used to refine or fill in areas corresponding to its location within in a larger model of the surface and/or subsurface, e.g., "patched in" to the model. Other data such as a digital elevation model, maps, etc. can be added to the acquired data as well, e.g., for spatial awareness, texturizing, etc. The data can be analyzed in view of other data, e.g., rock data. Further, the model can be augmented with other data. Such augmentation may take the form of a well log being drawn into the model, e.g., along an imaginary or planned well trajectory in the subsurface.

One or more parts of the model (e.g., a part represented by the acquired data) may be located via (e.g., text-based) searching in a map canvas, as at 406. For example, structured and/or unstructured metadata may be associated with various locations within the model. The metadata may be applied to the locations and denoted by tags, which may store a location as well as the metadata within a database. The metadata can directly describe, e.g., in text, aspects of the location with which it is associated. The metadata can also describe information about the data, such as when it was collected and how it has been subsequently used. Accordingly, when processing locations as candidates for drilling locations or wells, etc., searches can be conducted for analogous data based on the metadata.

Further, the data integrated into the model may be processed for visualization, as at 408. For example, the model can be used to create an immersive environment that readily depicts the information that was collected. A user can experience such an immersive environment, e.g., through a computer screen, virtual reality (VR) headset, or the like. This may facilitate the user making determinations about other, similar locations, as the overall surface and/or subsurface of the model may be rapidly viewed.

Additionally, the model may be updated, e.g., to fill in gaps, as at 410. For example, the visualization (e.g., immersive environment) of the model may reveal areas where information is lacking, or the metadata associated with one or more locations in the model may contain empty fields. If a user, for example, executes a search that returns such incomplete metadata or a tag associated with an incomplete dataset for its associated location, a "gap" may be identified. In response to identifying a gap, the method 400 may recommend data to be acquired in a subsequent field trip so as to fill the gap. Once this data is acquired, the method 400 may repeat, thereby enhancing the model, e.g., in an "evergreen" manner.

As such, the modeled data may serve as a digital analog or "twin" for a second location. The second locations may be difficult to reach as compared to the location represented by the modeled data, and thus identifying data that can be acquired in the location represented by the modeled data rather than the second location for which information is sought, may be cost-effective.

Figure 5:
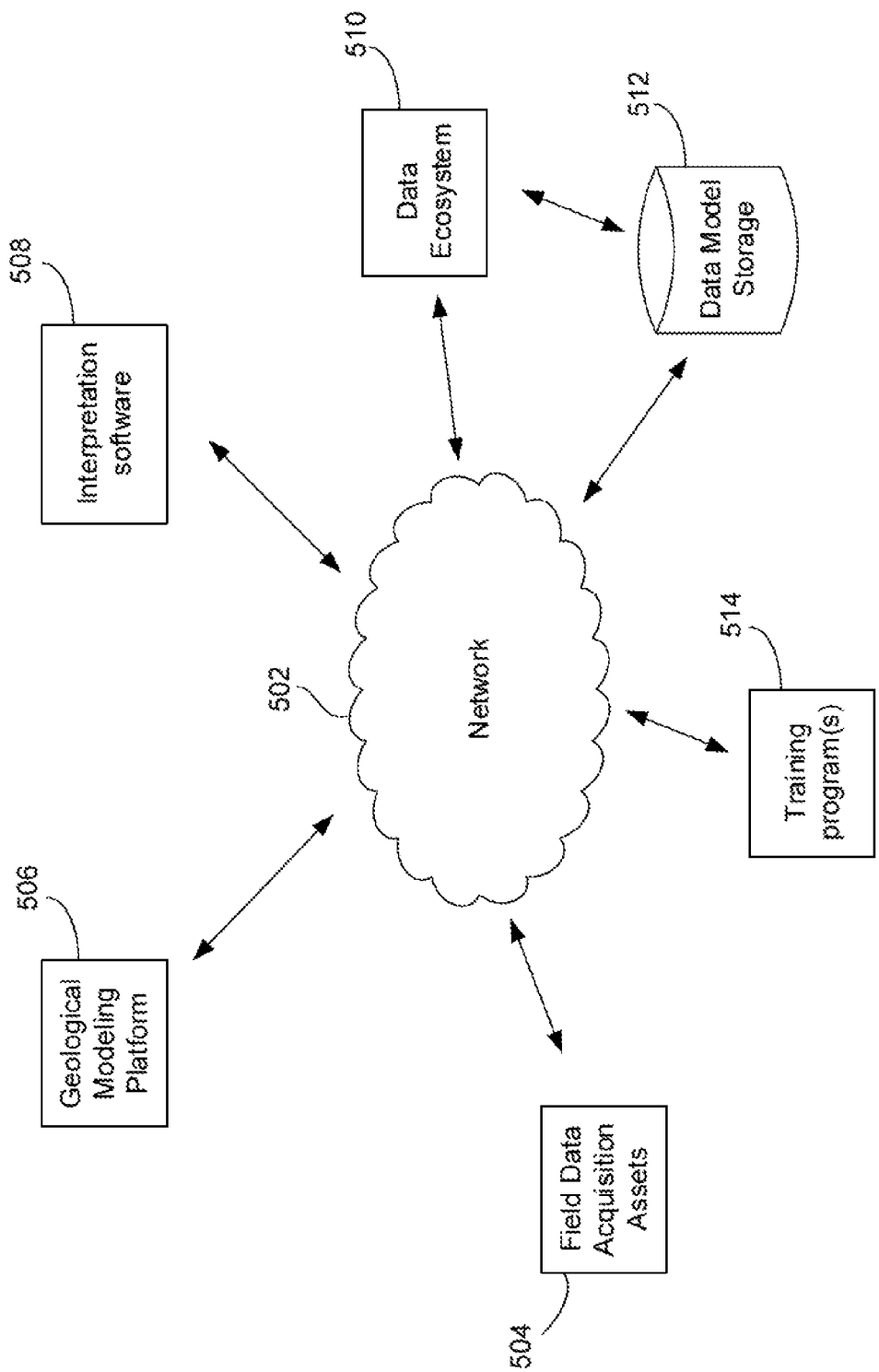
FIG. 5 illustrates a system that may be employed to implement the method, e.g., of FIG. 4, according to an embodiment.

FIG. 5 illustrates a system 500 that may be employed to implement the method 400, according to an embodiment. As shown, the system 500 includes various components that are able to communicate with one another via a network 502. The network 502 may be a local-area network, the internet, another wide-area network, including wireless and/or wired connectivity, etc. Any network that is able to convey information from one location of the system 500 to another may be used in various embodiments. Further, the system 500 may include field data acquisition assets 504. Field data acquisition assets may include human assets, e.g., teams, of technicians, scientists, engineers, etc. who may venture into the field and conduct research and gather data about the location. The field data acquisition assets 504 may also include satellites, cameras, drones, sensors, geophones, and/or any other device that may be used to collect data from a specified location, either at the surface or below.

The field data acquisition assets 504 may communicate via the network 502, or via a local communication link, with a geological modeling platform 506. The platform 506 may be a software program or a suite of software programs configured to receive the data collected in the field and process it into a visual representation, e.g., a model. The platform 506 may also be configured to perform various auto-interpretation tasks of the data in the model.

In turn, the geological modeling platform 506 may include, communicate with, or otherwise interface with interpretation software 508. The interpretation software 508 may be configured to analyze the data that forms the model. Further, the interpretation software 508 may discretize the model, e.g., construct a geocellular model which may be used for simulations, for example.

The newly-constructed, interpreted (e.g., discretized) model may then be fed to a data ecosystem 510, e.g., via the network 502 or via a local communication link. In some embodiments, the interpretation software 508 and/or the geological modeling platform 506 may be stored and executed by a server, which may also store and execute the data ecosystem. In other embodiments, multiple servers may be used, each with different or overlapping processing assignments within the context of the illustrated system 500. The data ecosystem 510 may store, e.g., in a storage 512 such as a model store, log store, etc., additional models constructed form other data, e.g., about other locations. Thus, the data that has been acquired, modeled, and interpreted may be "contextualized", e.g., fit into or "patched in" the context of one or more other, e.g., larger, models stored and accessible in the data ecosystem 510. Further, the aforementioned metadata may be included in the model, such that the data ecosystem 510 is able to perform searches in the model, as discussed above.

The data ecosystem 510 may also provide the model for visualization, e.g., for training purposes. Accordingly, the system 500 may include one or more training programs 514. Such training programs may include a variety of devices, such as display peripherals, including VR headsets.

Figure 6A:
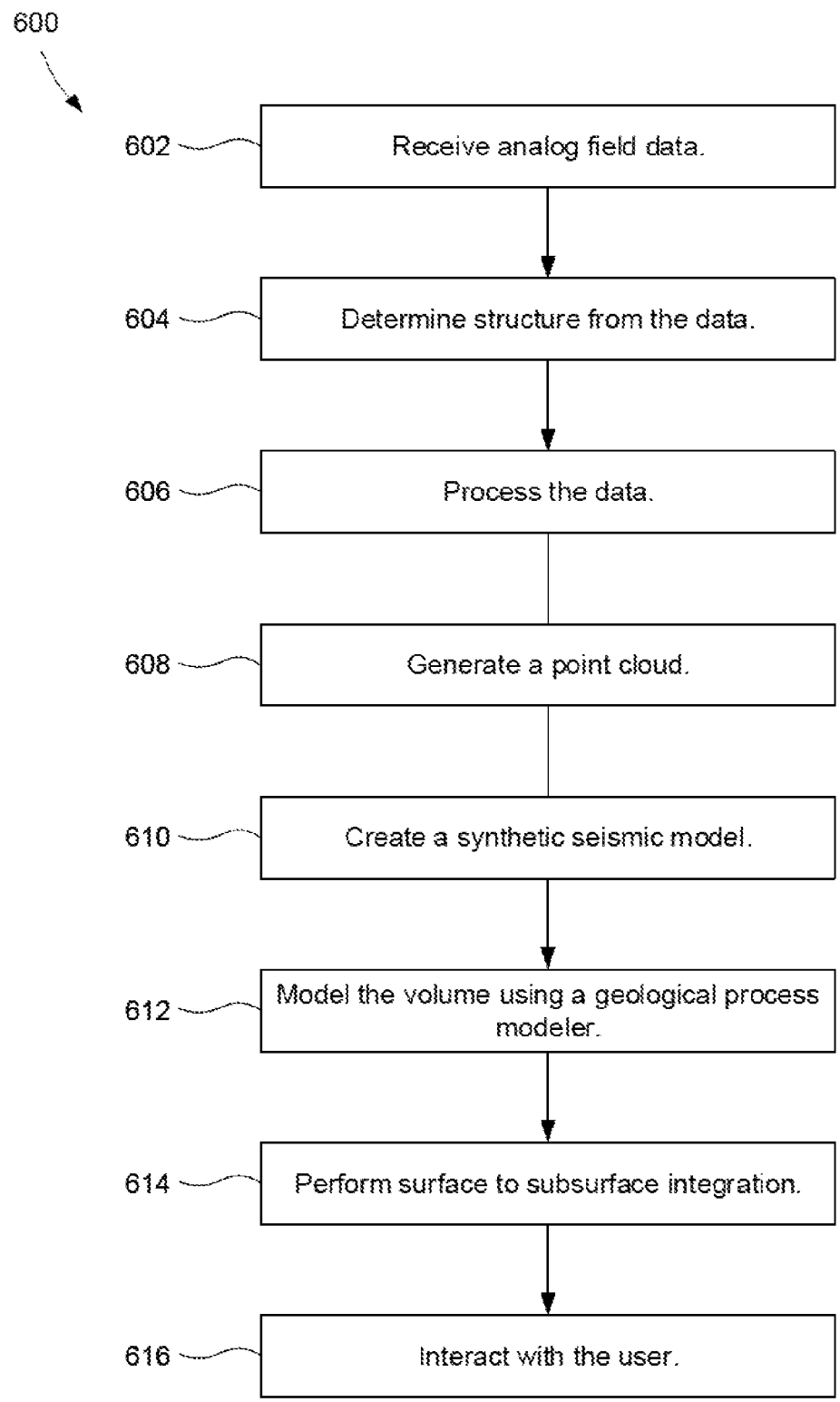
FIG. 6A illustrates a flowchart of a method for converting analog data to three-dimensional insights, which may be suitable for use with virtual reality and/or augmented reality, according to an embodiment.

FIG. 6A illustrates a flowchart of a method 600 for converting analog data to three-dimensional insights, which may be suitable for use with virtual reality and/or augmented reality, according to an embodiment. The method 600 may be employed as a part of the method 400, e.g., using at least a part of the system 500, according to an embodiment. In an embodiment, the method 600 may be employed in the context of creating synthetic seismic data for an analog location, although this is merely one example among many contemplated. The method 600 may begin by receiving field data, e.g., from human experts physically deployed into an oil and gas field, as at 602. The method 600 may then proceed to determining structure from the data, as at 604. The data may be motion data (drone, photographs, etc.) and/or LiDAR, hyperspectral imagery, satellite imagery, etc. The method 600 may then proceed to generating a three-dimensional point cloud, as at 606. The point cloud may be converted to a triangular mesh, surface, point set, etc. The point cloud may be imported into an exploration and production software platform.

Once the data is fed to the software platform (e.g., on the cloud), the method 600 may proceed to processing the data, as at 608, e.g., by performing data visualization, automated interpretation, quantitative/statistical analysis and classification. Based on the processed data, the method 600 may include creating a synthetic seismic volume (e.g., of an outcrop), as at 610. A geological process modeler may then be employed to model the volume, as at 612. Next, surface to subsurface integration may be performed, as at 614, e.g., using the outcrop and the geological process analogs for offshore seismic dataset interpretation and characterization. The method 600 may then proceed to immersive user interaction with the data, as at 616, which may facilitate interpretation of the data by users and/or training of the users.

Figure 6B:
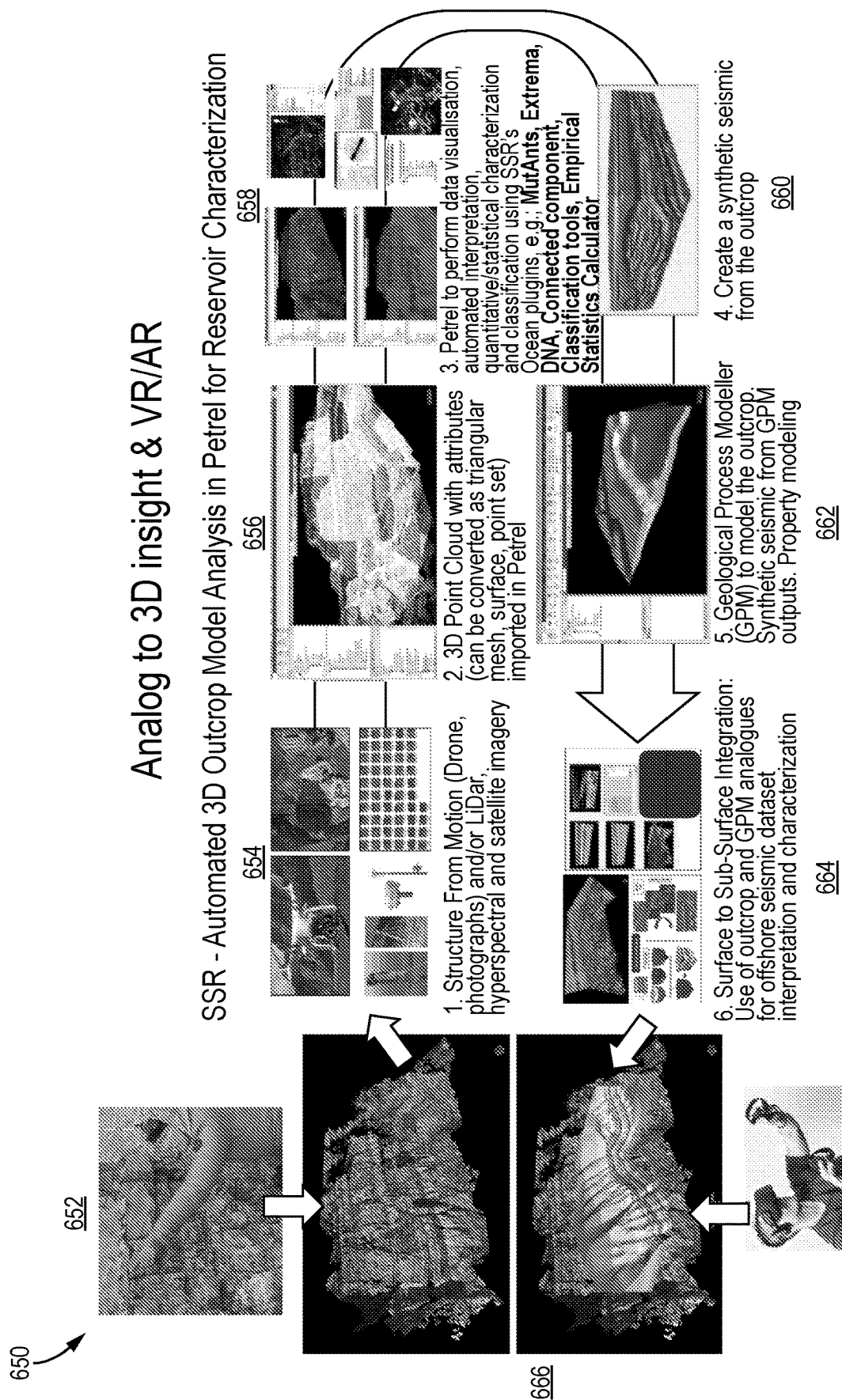
FIG. 6B illustrates a conceptual, graphical depiction of the method of FIG. 6A, according to an embodiment.

FIG. 6B illustrates a conceptual, graphical depiction 650 of the method 600, according to an embodiment. As shown in FIG. 6B, field data, e.g., from human experts physically deployed into an oil and gas field at 652 and field data acquisition devices at 654, may be collected and uploaded into a modeling platform. A 3D point cloud with attributes (e.g., converted as a triangular mesh, surface, point set, etc.) may then be created using the modeling platform, as indicated at 656. Interpretation software (within the modeling platform or external thereto) may perform data visualization, automated interpretation, quantitative/statistical analyses, classification, etc. to determine various attributes, characteristics, and classes of features, geology, rock formations, etc. found in the model, as indicated at 658.

A synthetic seismic model may then be generated from the model, as at 660. A geological process modeler (GPM) may then be used to model the outcrop, as at 662. The synthetic seismic data 660 may be altered, augmented, etc. using the GPM output, and properties of the formation may be modeled as well. A surface-to-subsurface integration may then be performed, as indicated at 664. The outcrop and GPM analogs for offshore seismic dataset interpretation and characterization may be used.

As shown at 666, the model created in part using the field data that was collected at 652 and 654 and analyzed/processed into a rendering via processes 656-664 may then be provided for viewing, e.g., in an immersive environment.

The immersive environment may be used for training purposes, identifying analog data, identifying gaps in the model, etc.

Figure 7:
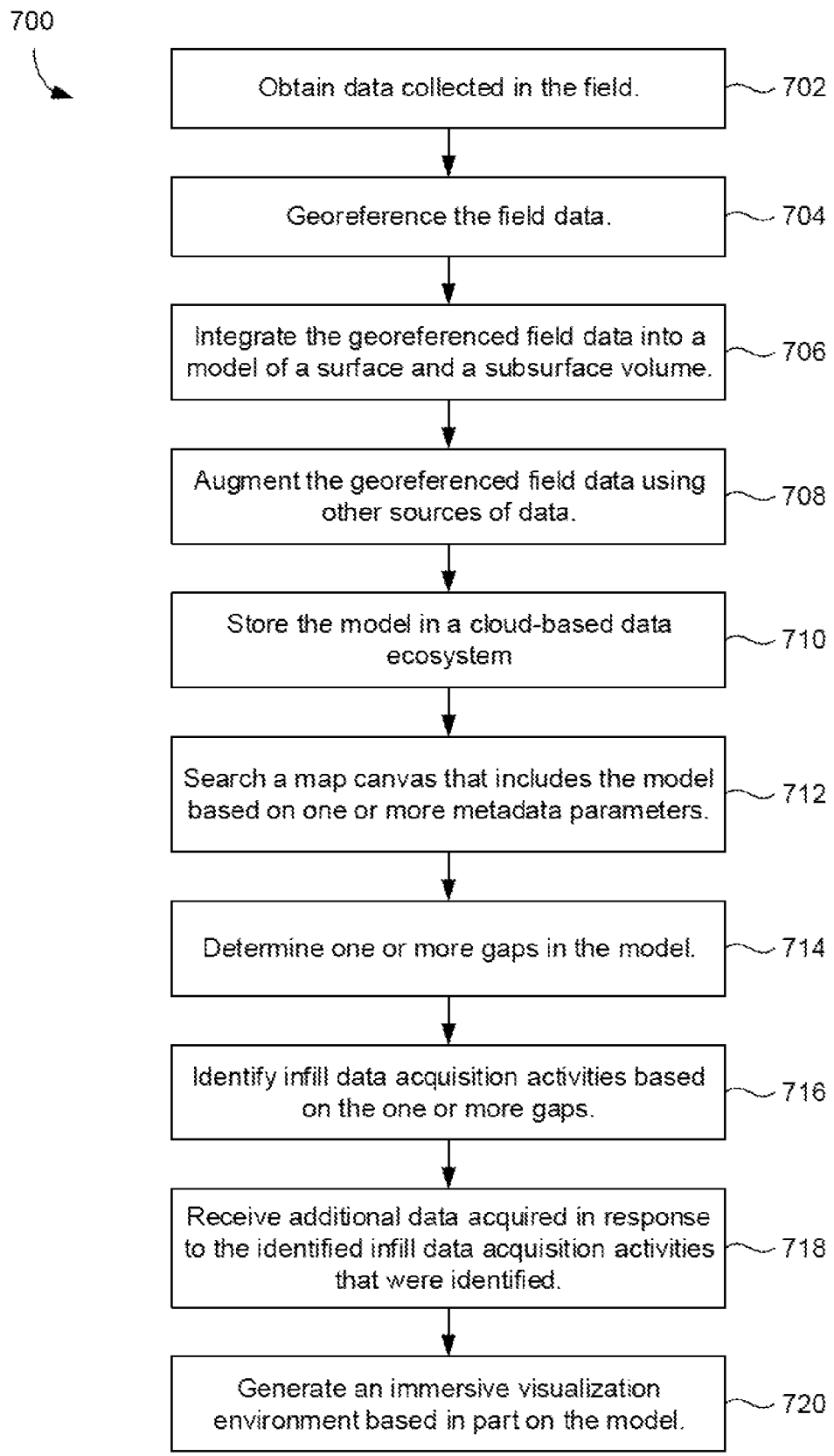
FIG. 7 illustrates a flowchart of a method for receiving, storing, and using data, e.g., to build geologic analog models, according to an embodiment.

FIG. 7 illustrates a flowchart of a method 700 for receiving, storing, and using data, e.g., to build geologic analog models (e.g., models that may be searched and used to inform decisions for subsequent exploration activities), according to an embodiment. In some embodiments, the method 700 may be a more-detailed view of the embodiment of the method 400 of FIG. 4, and thus should not be considered mutually exclusive therewith.

The method 700 may include obtaining data collected in the field, as at 702. The data may be collected from an "analog" location, that is, a location that may be useful later in making determinations about the geology, hydrocarbon existence, etc. of another location. For example, the analog location may be easier to reach or may otherwise have more data associated therewith (e.g., a more mature oilfield) than the other location.

The field data may be georeferenced, as at 704. For example, georeferencing may include applying coordinates to the field data, e.g., in terms of horizontal and vertical (e.g., depth and/or elevation) location. The georeferenced field data may then be integrated into a model of a surface and a subsurface volume, as at 706. In some embodiments, this may include a surface-to-subsurface inversion, using data available to resolve subsurface structure based at least in part on the outcroppings or other features visible at the surface. Further, generating the model of the volume may include discretizing the model, such that cells are defined in the model and associated with a location within the volume.

The georeferenced field data may also be augmented using other sources of data, as at 708. For example, well logs may be drawn into the model representing the data. Various other processing may also take place, e.g., depending on the information that is available. For example, calculated seismic attributes may be incorporated into the model as well as any surface data (e.g., LiDAR, etc.). Additionally, elevation data may be employed to texturize the model.

The model may be stored in a cloud-based data ecosystem (e.g., the ecosystem 510 discussed above), as at 710. This may facilitate retrieval of one or more portions and/or the model as a whole from one or more other locations.

The model stored in the cloud-based data ecosystem may include metadata. For example, metadata may be stored in association with one, some, or all of the cells of the model. In some embodiments, metadata tags may be employed, which may link a location (e.g., a cell) with the metadata. The metadata may enable the map to be searched for characteristics, e.g., using text-based searching. Image based or other types of searching may also be used.

Accordingly, the method 700 may include searching a map canvas that includes the model based on one or more metadata search parameters, as at 712. The metadata search parameters may be defined based on a location of interest and may specify characteristics of the location of interest for which analogous data is helpful. For example, a specific geology, petroleum system, structure, feature, depositional time, etc., could be specified, and used as a metadata parameter for the search. The method 700 may thus include searching at 712 through its database of metadata, associated with the model, in order to find analog data that is of use based on the search (e.g., based on one or more characteristics of a second location). The results of the search, e.g., identification of one or more analog locations, may be ranked, curated, or otherwise prioritized based on similarity, geographic nearness, data, or any other factor to facilitate use, or may be returned in any manner suitable.

In some embodiments, the method 700 may determine or otherwise identify one or more gaps in the model, as at 714. For example, metadata may be missing for certain locations, indicating that data is scarce for these locations. If these locations are of interest, e.g., based on search frequency or otherwise by indication of a user, the method 700 may prioritize a given gap as one for which data infill may be called for.

Accordingly, the method 700 may include identifying infill data acquisition activities based on the one or more gaps, as at 716. The infill data acquisition activities may specify a certain type of data, location to collect the data, etc., which, if successfully acquired, would likely fill the gap that was determined at 714. For example, the infill data acquisition activities may specify a field trip, including acquisition equipment (e.g., drones, cameras, etc.) that may be used to collect the additional data. The method 700, in some embodiments, may then include scheduling and executing the field trip to collect the additional data.

The additional data may be acquired, as at 716, in response to the identified infill data acquisition activities that were identified. In other words, the field trip may be conducted as a result of the suggestion by the method 700, and the requested data may be acquired to fill in the gap that was identified. This process of identifying a gap in the model, suggesting a fix, and then updating the model may be repeated for as many times as is helpful.

In some embodiments, an immersive visualization environment may be generated based in part on the model, as at 718. For example, three-dimensional rendering of the model may be accessed by a training program (e.g., the training program 514), and displayed for a user, e.g., in a VR headset or any other type of display.

Figure 8A:
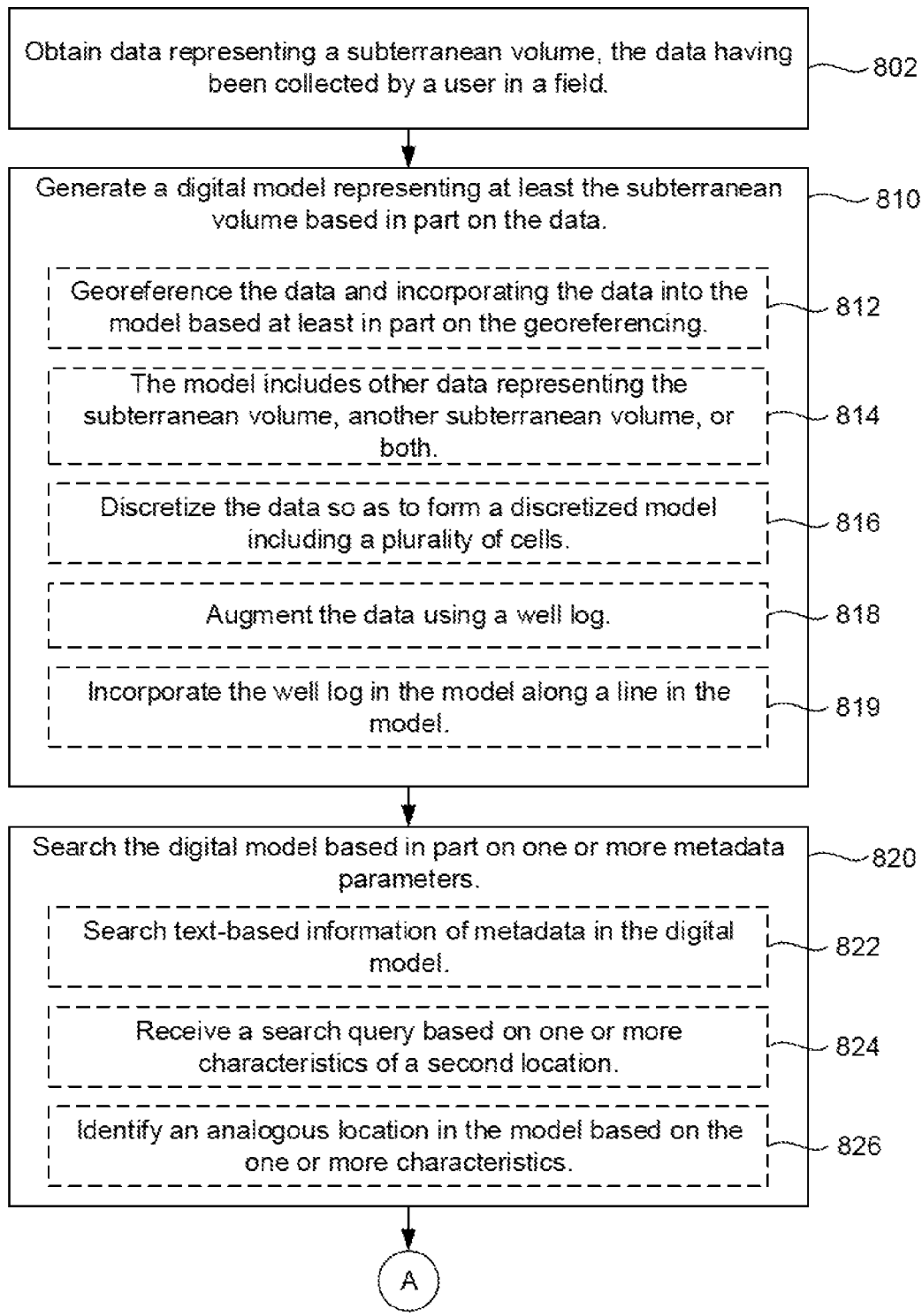
FIGS. 8A and 8B illustrate a flowchart of a method, according to an embodiment.
Figure 8B:
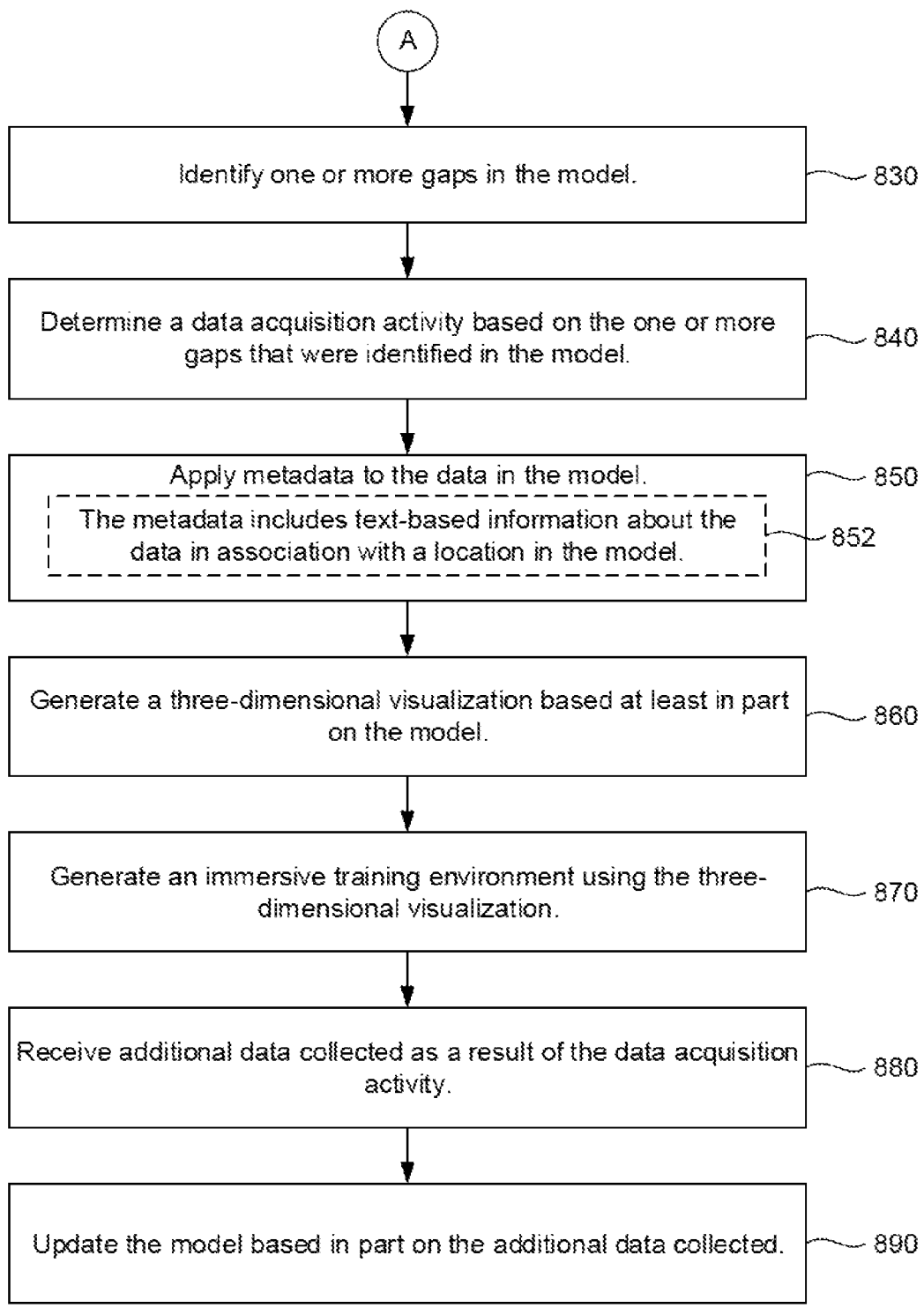

FIGS. 8A and 8B illustrate a flowchart of a method 800, according to an embodiment. The method 800 includes obtaining data representing a subterranean volume, the data having been collected by a user in a field, as at 802 (e.g., FIG. 4, 402, data such as seismic data, surface data, etc. that was collected in the field is obtained).

The method 800 also includes generating a digital model representing at least the subterranean volume based in part on the data, as at 810 (e.g., FIG. 4, 404, the data that was obtained is used to generate a digital (computer) model). In an embodiment, generating the digital model at 810 includes georeferencing the data and incorporating the data into the model based at least in part on the georeferencing, as at 812 (e.g., FIG. 7, 704, the data that is collected and/or inserted into the model is georeferenced so it can be incorporated or "patched in" to a larger model). In an embodiment, the model includes other data representing the subterranean volume, another subterranean volume, or both, as at 814 (e.g., FIG. 7, 706, as described above, the model is patched into the larger model). In an embodiment, generating the digital model at 810 includes discretizing the data so as to form a discretized model comprising a plurality of cells, as at 816 (e.g., FIG. 7, 706, the model may be discretized as part of the process of ingesting and integrating the model into the larger model).

In an embodiment, generating the digital model at 810 includes augmenting the data using a well log, as at 818 (e.g., FIG. 7, 708, the data is augmented, e.g., using a well log). In such an embodiment, the generating the digital model at 810 may also include incorporating the well log in the model along a line in the model, as at 819 (e.g., FIG. 7, 708, the well log is included along an imaginary line, e.g., a planned well trajectory, in the model).

The method 800 further includes searching the digital model based in part on one or more metadata parameters, as at 820 (e.g., FIG. 7, 712, the model can be discovered in a search based on metadata). In an embodiment, searching the digital model at 820 may include searching text-based information of metadata in the digital model, as at 822 (e.g., FIG. 7, 712, the metadata is structured or unstructured, text-based to facilitate searching). In an embodiment, searching at 820 may include receiving a search query based on one or more characteristics of a second location, as at 824 (e.g., FIG. 7, 712, metadata searched based on one or more characteristics of a second location). In such an embodiment, searching at 820 may also include identifying an analogous location in the model based on the one or more characteristics, as at 826 (e.g., FIG. 7, 712, the result of the search is analog locations and/or data associated therewith).

The method 800 also includes identifying one or more gaps in the model, as at 830 (e.g., FIG. 7, 714, gaps are identified in the model based on incomplete data). The method 800 includes determining a data acquisition activity based on the one or more gaps that were identified in the model, as at 840 (e.g., FIG. 7, 716, create data acquisition activities tailored to generate the missing data).

In an embodiment, the method 800 may further include applying metadata to the data in the model, as at 850 (e.g., FIG. 4, 408, the data that is searched is metadata applied to the model). The metadata may include text-based information about the data in association with a location in the model, as at 852 (e.g., FIG. 4, 408, the metadata is text-based).

In an embodiment, the method 800 includes generating a three-dimensional visualization based at least in part on the model, as at 860 (e.g., FIG. 4, 410, visualize the model, e.g., in a three-dimensional view). In an embodiment, the method 800 also includes generating an immersive training environment using the three-dimensional visualization, as at 870 (e.g., FIG. 4, 410).

In an embodiment, the method 800 may also include receiving additional data collected as a result of the data acquisition activity, as at 880 (e.g., FIG. 7, 716, infill data from data acquisition activities are received). The method 800 may further include updating the model based in part on the additional data collected, as at 890 (e.g., FIG. 7, 716, the infill data is used to fill in the gaps or "update" the model).

Figure 9:
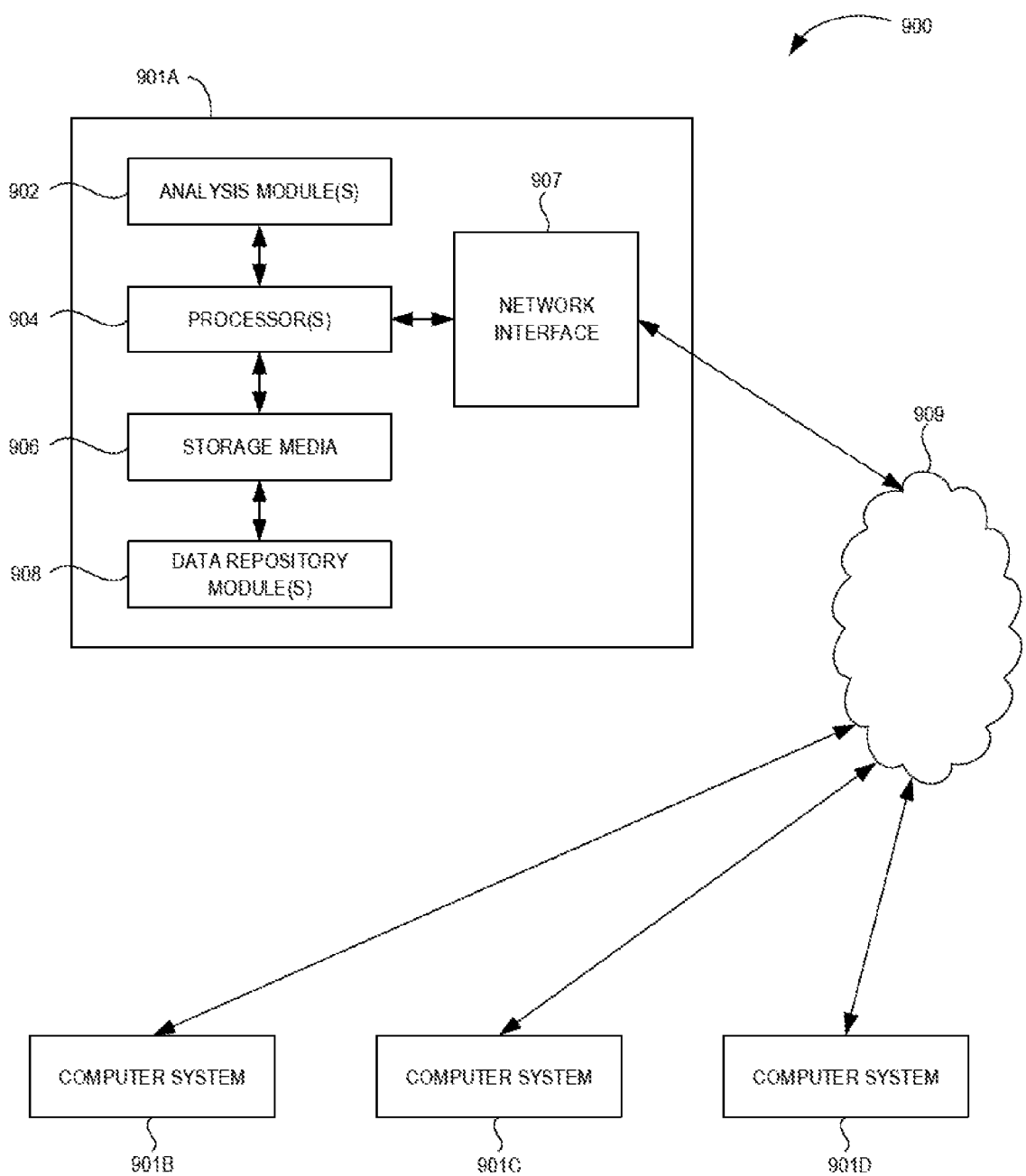
FIG. 9 illustrates a schematic view of a computing system for performing one or more of the methods disclosed herein, according to an embodiment.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 900 contains one or more data repository module(s) 908. In the example of computing system 900, computer system 901A includes the data repository module 908. In some embodiments, a data repository module may be used to perform some or all aspects of one or more embodiments of the methods. In alternate embodiments, a plurality of data repository modules may be used to perform some or all aspects of methods.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method comprising:
    obtaining data representing a subterranean volume, the data having been collected by a user in a field;
    generating a digital model representing at least the subterranean volume based in part on the data;
    searching the digital model based in part on one or more metadata parameters, the one or more metadata parameters describing one or more characteristics of a target location;
    identifying, based on the searching, a plurality of analogous locations in the digital model based on the one or more characteristics of the target location;
    prioritizing a first analogous location included in the plurality of analogous locations over a second analogous location included in the plurality of analogous locations based on a geographic relationship between the first analogous location and the target location;
    identifying, based on the searching, one or more gaps in the digital model; and
    determining a data acquisition activity based on the one or more gaps that were identified in the digital model.

2. The method of claim 1, further comprising applying metadata to data in the digital model, wherein the metadata include text-based information about the data in association with a location in the digital model, and wherein searching the digital model comprises searching the text-based information of the metadata.

3. The method of claim 1, wherein generating the digital model comprises georeferencing the data and incorporating the data into the digital model based at least in part on the georeferencing, wherein the digital model includes other data representing the subterranean volume, another subterranean volume, or both.

4. The method of claim 1, wherein generating the digital model comprises discretizing the data so as to form a discretized model comprising a plurality of cells.

5. The method of claim 1, further comprising:
    generating a three-dimensional visualization based at least in part on the digital model; and
    generating an immersive training environment using the three-dimensional visualization.

6. The method of claim 1, wherein generating the digital model comprises:
    augmenting the data using a well log; and
    incorporating the well log in the digital model along a line in the digital model.

7. The method of claim 1, further comprising:
    receiving additional data collected as a result of the data acquisition activity; and
    updating the digital model based in part on the additional data collected.

8. A non-transitory computer-readable medium storing instructions that, when executed by at least one processor of a computing system, cause the computing system to perform operations, the operations comprising:
    obtaining data representing a subterranean volume, the data having been collected by a user in a field;
    generating a digital model representing at least the subterranean volume based in part on the data;
    searching the digital model based in part on one or more metadata parameters, the one or more metadata parameters describing one or more characteristics of a target location;
    identifying, based on the searching, a plurality of analogous locations in the digital model based on the one or more characteristics of the target location;
    prioritizing a first analogous location included in the plurality of analogous locations over a second analogous location included in the plurality of analogous locations based on a geographic relationship between the first analogous location and the target location;
    identifying, based on the searching, one or more gaps in the digital model; and
    determining a data acquisition activity based on the one or more gaps that were identified in the digital model.

9. The medium of claim 8, wherein the operations further comprise applying metadata to data in the digital model, wherein the metadata include text-based information about the data in association with a location in the digital model, and wherein searching the digital model comprises searching the text-based information of the metadata.

10. The medium of claim 8, wherein generating the digital model comprises georeferencing the data and incorporating the data into the digital model based at least in part on the georeferencing, wherein the digital model includes other data representing the subterranean volume, another subterranean volume, or both.

11. The medium of claim 8, wherein generating the digital model comprises discretizing the data so as to form a discretized model comprising a plurality of cells.

12. The medium of claim 8, wherein the operations further comprise:
    generating a three-dimensional visualization based at least in part on the digital model; and
    generating an immersive training environment using the three-dimensional visualization.

13. The medium of claim 8, wherein generating the digital model comprises:
    augmenting the data using a well log; and
    incorporating the well log in the digital model along a line in the digital model.

14. The medium of claim 8, wherein the operations further comprise:
    receiving additional data collected as a result of the data acquisition activity; and updating the digital model based in part on the additional data collected.

15. A computing system, comprising:
one or more processors; and
a memory system comprising one or more non-transitory computer-readable media storing instructions that, when executed by at least one of the one or more processors, cause the computing system to perform operations, the operations comprising:
obtaining data representing a subterranean volume, the data having been collected by a user in a field;
generating a digital model representing at least the subterranean volume based in part on the data;
searching the digital model based in part on one or more metadata parameters, the one or more metadata parameters describing one or more characteristics of a target location;
identifying, based on the searching, a plurality of analogous locations in the digital model based on the one or more characteristics of the target location;
prioritizing a first analogous location included in the plurality of analogous locations over a second analogous location included in the plurality of analogous locations based on a geographic relationship between the first analogous location and the target location;
identifying, based on the searching, one or more gaps in the digital model; and
determining a data acquisition activity based on the one or more gaps that were identified in the digital model.

16. The computing system of claim 15, wherein the operations further comprise applying metadata to data in the digital model, wherein the metadata include text-based information about the data in association with a location in the digital model, and wherein searching the digital model comprises searching the text-based information of the metadata.

17. The computing system of claim 15, wherein generating the digital model comprises georeferencing the data and incorporating the data into the digital model based at least in part on the georeferencing, wherein the digital model includes other data representing the subterranean volume, another subterranean volume, or both.

* * * * *